US008710124B2

(12) United States Patent
Lo et al.

(10) Patent No.: US 8,710,124 B2
(45) Date of Patent: Apr. 29, 2014

(54) FLAME RETARDANT THERMOPLASTIC ELASTOMERS

(75) Inventors: Lawrence Lo, Lexinton, MA (US); Albertus Otto Dozeman, Born (NL); Yundong Wang, Lancaster, MA (US); Ryszard Brzoskowski, Acton, MA (US)

(73) Assignee: Teknor Apex Company, Pawtucket, RI (US)

( * ) Notice: Subject to any disclaimer, the term of this patent is extended or adjusted under 35 U.S.C. 154(b) by 210 days.

(21) Appl. No.: 13/132,663

(22) PCT Filed: Dec. 2, 2009

(86) PCT No.: PCT/EP2009/066210
§ 371 (c)(1),
(2), (4) Date: Aug. 22, 2011

(87) PCT Pub. No.: WO2010/063748
PCT Pub. Date: Jun. 10, 2010

(65) Prior Publication Data
US 2011/0294930 A1    Dec. 1, 2011

Related U.S. Application Data

(60) Provisional application No. 61/119,590, filed on Dec. 3, 2008.

(30) Foreign Application Priority Data

Feb. 4, 2009 (EP) .................................. 09152058

(51) Int. Cl.
*C08K 5/3467* (2006.01)
*C08K 5/3492* (2006.01)
*C08K 5/00* (2006.01)
*C08K 5/03* (2006.01)

(52) U.S. Cl.
USPC ........................................... 524/100; 524/484

(58) Field of Classification Search
USPC ...................................................... 524/100, 484
See application file for complete search history.

(56) References Cited

U.S. PATENT DOCUMENTS

| 5,326,805 A | 7/1994 | Sicken et al. |
| 2003/0083442 A1 | 5/2003 | Nishihara et al. |
| 2007/0112132 A1 | 5/2007 | Zhao et al. |
| 2007/0176154 A1* | 8/2007 | Murase et al. ................ 252/601 |
| 2008/0277136 A1* | 11/2008 | Reyes ....................... 174/110 R |

FOREIGN PATENT DOCUMENTS

WO    WO 2004/044049    5/2004

OTHER PUBLICATIONS

International Search Report for PCT/EP2009/066210, mailed Apr. 13, 2010.

* cited by examiner

*Primary Examiner* — Kriellion Sanders
(74) *Attorney, Agent, or Firm* — Hudak, Shunk & Farine Co. LPA

(57) ABSTRACT

The invention relates to a thermoplastic elastomer composition comprising a thermoplastic elastomer and a flame retardant, wherein the flame retardant comprises at least a compound selected from the group consisting of piperazine phosphate, piperazine pyrophosphate and piperazine polyphosphate, and a phosphoric acid compound.

19 Claims, No Drawings

FLAME RETARDANT THERMOPLASTIC ELASTOMERS

This application is the U.S. national phase of International Application No. PCT/EP2009/066210, filed 2 Dec. 2009, which designated the U.S. and claims priority to EP Application No. 09152058.5, filed 4 Feb. 2009; and claims the benefit of U.S. Provisional Application No. 61/119,590, filed 3 Dec. 2008, the entire contents of each of which are hereby incorporated by reference.

This invention relates to a thermoplastic elastomer composition having flame retardant properties.

Thermoplastic polymers have been applied widely to constructional materials, automotive parts, packaging materials, agricultural materials, housings of appliances, toys, and so forth because of their excellent chemical and mechanical characteristics. However, most of synthetic polymers are combustible and indispensably need to be rendered flame retardant for a number of applications. It is well known that flame retardation can be achieved by using halogen containing flame retardants. However, there is a great concern over the environmental impact of halogenated materials and non halogenated alternatives are being sought.

For example, U.S. Pat. No. 5,326,805 discloses a flame retardant composition of improved stability comprising an olefin polymer and ammonium polyphosphate ($NH_4PO_3)_n$—a halogen free flame retardant—and a reaction product of tris(2-hydroxyethyl) isocyanurate (THEIC) with an aromatic polycarboxylic acid ($Ar(COOH)_m$. The problem of this approach is that the flame retardant materials are partially soluble in water.

They also do not possess good physical properties and extrusion surface quality.

US2007/0112132A1 describes a thermoplastic composition comprising a poly(arylene)ether, a hydrogenated block copolymer, a pre-blend of a thermoplastic vulcanizate and a hydrogenated block copolymer, an ethylene/alpha-olefin copolymer, and a hydrocarbon resin. In this thermoplastic composition the following halogen free flame retardants are used: n-butylated triphenyl phosphate, resorcinol bis(diphenylphosphate ester oligomers and bisphenol A bis(diphenylphosphate) ester. Because of the liquid nature of the flame retardant component(s) used in these compositions, there are limitations for this approach due to limited compatibility of the flame retardants and these thermoplastic compositions. The compositions have tendency to show blooming of the flame retardants on the surface, which may cause a shiny appearance and/or leakage and odor from the composition. It is also difficult to make softer material, since the blooming effect will be larger for softer materials.

This will result in dissolution of the flame retardants when articles made from said compositions come in contact with water thereby loosing it's flame retardant properties over time.

The thermoplastic compositions mentioned in US2007/0112132A1 have a Shore A hardness above 95 and tensile elongation values below 250%. The flame retardant thermoplastic compositions of the prior art in general possess high hardness and limited elastic properties. Halogen free flame retardant thermoplastic elastomer compositions having low hardness and low surface roughness, excellent elastic and flame retardant properties are not known in the art.

It is an object of the present invention to provide a flame retardant thermoplastic elastomer composition at low hardness having excellent mechanical properties like tensile strength, elongation at break and low compression set values at 70° C. It also has excellent extrusion quality such as low surface roughness. This invention also can provide low hardness material without the problems of blooming and odor, yet having excellent flame retardant properties.

The invention relates to a thermoplastic elastomer composition comprising a thermoplastic elastomer and a flame retardant, wherein the flame retardant comprises at least a compound selected from the group consisting of piperazine phosphate, piperazine pyrophosphate and piperazine polyphosphate, and a phosphoric acid compound.

In a preferred embodiment, the invention relates to a thermoplastic elastomer composition comprising a thermoplastic elastomer and a flame retardant, wherein the flame retardant comprises at least a compound selected from the group consisting of piperazine phosphate, piperazine pyrophosphate and piperazine polyphosphate, and a phosphoric acid compound, wherein the thermoplastic elastomer has a hardness of less than 95 Shore A, more preferably less than 93 Shore A, or less than 84 Shore A.

The thermoplastic elastomer comprises a thermoplastic polyolefin, a dynamically vulcanized elastomer comprising monomer units of ethylene, an α-olefin and optionally one or more non-conjugated polyenes and oil.

In a preferred embodiment of the invention, the thermoplastic elastomer comprises a polypropylene, an elastomer and an oil. A most preferred embodiment of the invention is a thermoplastic elastomer, comprising a polypropylene, dynamically vulcanized EPDM and an oil.

In one embodiment the thermoplastic elastomer of the invention consists of a polypropylene homopolymer, a dynamically vulcanized EPDM, oil and optionally a filler and/or additives.

A thermoplastic elastomer comprising a dynamically vulcanized elastomer is also known as thermoplastic vulcanizate (TPV).

Examples of the thermoplastic polyolefin suitable to be used in the thermoplastic elastomer composition according to the invention are homopolymers of ethylene or propylene, copolymers of ethylene and propylene, copolymers of ethylene and an α-olefin co-monomer with 4-20 carbon atoms or copolymers of propylene and an α-olefin co-monomer with 4-20 carbon atoms. In case of a copolymer of propylene and an alpha-olefin co-monomer with 4-20 carbon atoms, the content of the propylene monomer units in said copolymer is preferably at least 75% by weight. The thermoplastic polyolefin homo- and copolymers may be prepared with a Ziegler-Natta catalyst, a metallocene catalyst or with another single site catalyst.

Preferably, polypropylene, polyethylene or mixtures thereof are used as thermoplastic polyolefin. More preferably polypropylene is used as thermoplastic polyolefin. Most preferably a polypropylene homopolymer is used or a $C_3C_x$ copolymer having at least 90% by weight $C_3$, in which $C_3$ stands for propylene and $C_x$ for any α-olefin other than propylene.

The Melt flow rate (MFR) of the polypropylene preferably is between 0.3 and 50 (grams/10 minutes); more preferably between 0.5 and 20 (according to ISO norm 1133 (230° C.; 2.16 kg load)).

The amount of thermoplastic polyolefin is generally less than 45% by weight relative to the total weight of the thermoplastic elastomer. Preferably the amount is less than 25% by weight, more preferably less than 15% by weight relative to the weight of the thermoplastic elastomer. Preferably the amount of thermoplastic polyolefin is above 3% by weight relative to the total weight of the thermoplastic elastomer.

The elastomer used in the thermoplastic elastomer composition of the present invention comprises monomer units of ethylene, an α-olefin and optionally one or more non-conjugated polyenes. The elastomer may comprise as the α-olefin an α-olefin comprising from 3-20 carbon atoms. Examples of the α-olefins are propylene, butylene, hexene, octene and the like. Preferably propylene is used as the α-olefin.

The weight ratio between ethylene and the α-olefin in the elastomer preferably is between 90/10 and 20/80, more preferably between 70/30 and 40/60.

Preferably the elastomer used in the thermoplastic elastomer composition according to the invention comprises a non-conjugated polyene. This enables very well a controlled dynamic vulcanization.

Examples of non-conjugated polyenes that may be used in the elastomer are 5-ethylidene norbornene (ENB), 5-vinyl-2-norbornene (VNB), dicyclopentadiene (DCPD) and 1,4 hexadiene. It is also possible that the elastomers comprised two or more different polyenes, for example ENB and VNB.

In one embodiment the elastomer preferably comprises 1-12 weight % of the polyene, more preferably 2-10 weight %, relative to the weight of the elastomers.

In one embodiment the thermoplastic elastomer may contain other elastomers like for example styrene-based thermoplastic elastomers. Styrene-based thermoplastic elastomers are for example block copolymers or terpolymers having one or two terminal polymeric blocks of for example polystyrene or poly-alpha-methylstyrene, and at least one non-terminal block of an elastomeric polymer, for example polybutadiene or polyisoprene. Typical examples of such block copolymers are those of general form polystyrene-polybutadiene-polystyrene (SBS), polystyrene-poly(ethylene/propylene) (SEP), polystyrene-polyisoprene-polystyrene (SIPS), poly-alpha-methylstyrene-polybutadiene-poly-alpha-methylstyrene, polystyrene-poly(ethylene-propylene)-polystyrene (SEPS), polystyrene-poly(ethylene/butylenes)-polystyrene (SEBS), polystyrene-poly(ethylene/ethylene/propylene)-b-polystyrene (SEEPS), polystyrene-polyisobutylene-polystyrene (SIBS) or crosslinkable styrenic block copolymers.

The amount of elastomer is generally less than 80% by weight relative to the total weight of the thermoplastic elastomer. Preferably the amount of elastomer is less than 70% by weight, more preferably less than 60% by weight relative to the weight of the thermoplastic elastomer, but preferably at least 20 wt %.

The thermoplastic elastomer according to the invention may comprise any oil known to be suitable for use in thermoplastic vulcanizates (TPV's). Examples of suitable oils are paraffinic oil, naphthenic oil and aromatic oil. Most suitable are very pure paraffinic oils, also indicated as white oils. Examples of suitable paraffinic oils are oils produced by for example Chevron (Paralux 6001), Flint Hill Resources (Ultra 1199), Exxon Mobil or PetroCanada (Puretol PSO 550(D)).

The amount of oil is less than 80% by weight relative to the total weight of the thermoplastic elastomer. Preferably the amount of oil is less than 70% by weight, more preferably less than 60% by weight relative to the weight of the thermoplastic elastomer. Preferably the amount of oil is above 20% by weight relative to the weight of the thermoplastic elastomer.

The elastomers and polyolefin materials described above can partly or fully be replaced by one of the mixture of ethylene or propylene based random copolymers or block copolymers. These include propylene/ethylene copolymers, EVA (ethylene vinyl acetate copolymer), and copolymers of ethylene and butylene, hexene, or octene as far as properties are not negatively influenced. The examples of these copolymers and mixture of copolymers include Dow's Engage and Infuse products, ExxonMobil's Exact and Vistamaxx polyolefin elastomers, LyondellBasell's Softell products.

The thermoplastic elastomer composition of the present invention comprises preferably between 30 and 93 wt % of the thermoplastic elastomer and between 7 and 70 wt % of the flame retardant. More preferably the thermoplastic elastomer composition comprises between 35 and 85 wt % thermoplastic elastomer and 15 to 65 wt % flame retardant, or more preferably between 75 and 45 wt % thermoplastic elastomer and between 25 and 55 wt % flame retardant.

The flame retardant comprises a salt of piperazine and an inorganic phosphorus compound which is the first ingredient of the flame retardant and is selected from the group consisting of piperazine phosphate, piperazine pyrophosphate and piperazine polyphosphate, these being used alone or in combination.

The blending ratio of piperazine and inorganic phosphorus compound (composition ratio of the first ingredient) is not particularly limited provided that it is within the range wherein a flame retarding effect is obtained, but the molar ratio of nitrogen atoms in the piperazine and phosphorus atoms in the inorganic phosphorus compound is preferably from 1:5 to 5:1 and more preferably from 1:2 to 2:1.

The flame retardant comprises between 20 and 90% by weight of the compound selected from the group consisting of piperazine phosphate, piperazine pyrophosphate and piperazine polyphosphate, relative to the total amount of the flame retardant, more preferably between 35 and 85% by weight and most preferably between 50 and 80% by weight.

Next the flame retardant comprises a phosphoric acid compound, which is the second ingredient of the flame retardant. This phosphoric acid compound preferably comprises a salt of melamine and an inorganic phosphorus compound and is selected from the group consisting of melamine phosphate, melamine pyrophosphate and melamine polyphosphate, these being used alone or in combination.

The blending ratio of melamine and inorganic phosphorus compound is not particularly limited provided it is within the range wherein a flame retarding effect is obtained, but the molar ratio of the nitrogen atoms of melamine to the phosphorus atoms of the inorganic phosphorus compound is preferably from 1:5 to 5:1, and more preferably from 1:3 to 3:1.

The flame retardant comprises between 10 and 80% by weight of the phosphoric acid compound, relative to the total amount of the flame retardant, more preferably between 15 and 65% by weight and most preferably between 20 and 50% by weight.

The thermoplastic elastomer composition according to the present invention can be made in several ways. In one embodiment the thermoplastic elastomer is produced separately, using for example a twin screw extruder. Such thermoplastic elastomer can also be bought commercially, like for example thermoplastic elastomers such as Sarlink M135N based on EPDM, polypropylene and oil. It is possible to make the thermoplastic elastomer composition comprising TPV and the flame retardant in one step.

It is possible to inject part of the oil downstream. The flame retardant raw material can also be fed downstream using a side feeder.

The thermoplastic elastomer compositions show unexpected properties. The compositions have a low hardness, a high tensile elongation, good modules, low compression set (70° C., 22 hrs), good surface roughness and show excellent flame retardant properties. The elongation ranges between 300 and 1000%, preferably between 350 and 900%. The hardness ranges between 25 and 98 Shore A, preferably between 50 and 94 Shore A. Alternatively the hardness is below 38 Shore D, or 36 Shore D. The compression set (70° C., 22 hrs) is between 10 and 70%, preferably between 20 and 61%. The average surface roughness of an extruded profile is between 0.1 µm and 2.0 µm Ra, preferably between 0.2 µm and 1.6 µm Ra.

The peak to valley roughness ranges between 1 µm and 11 µm Ry, preferably between 2 µm and 10 µm Ry. The tensile strength ranges between 2 and 20 MPa. At the same time the composition has a UL-94 flammability rating @ 3.15 mm of V-O or better.

Applications

The obtained compositions can be used in flexible parts and/or seals/gaskets. Examples are flexible cables or flexible end plugs used for example in wire and cable applications, grommets, corrugated tubes/pipes, flexible gaskets or seals used for static and dynamic applications used for example in building and construction and transportation.

EXAMPLES

The compositions from the examples and comparative experiments were obtained using a Berstorff ZE25X44D 25 mm twin screw extruder with 44 L/D. Processing conditions were: screw RPM 350, barrel zone temperature from 325° F. to 350° F. and extrusion rate of 20 lbs/hr. Two feeders were used to feed the raw materials into the first barrel of the extruder. One feeder is used to feed the flame retardant raw material. The other raw materials (including TPV, polypropylene, black color concentrate, polyolefin copolymer blend, talc, SEBS and/or oil) were pre-blended and fed to extruder from the second feeder. All raw materials were melt blended in the extruder and then pelletized to solid pellets.

Test Methods

The properties of the flame retardant containing thermoplastic elastomer compositions were analysed on injection molded parts except surface roughness. All compounds were dried for at least three hours at 82° C. to remove any residual moisture prior to injection molding or extrusion. Tensile test bars were cut from 101.6 mm×152.4 mm×2.0 mm (4"×6"× 0.08") fan gated injection molded plaques at perpendicular to flow direction. Compression set test buttons were cut from 101.6 mm×76.2 mm×12.7 mm (4"×3"×0.5") injection molded plaques.

Different Properties were Analysed;
Tensile strength, MPa, according to ISO 37:2005
Elongation, %, according to ISO 37:2005
100% modulus, MPa, according to ISO 37:2005
Compression set (CS), %, according to ISO 815
Hardness, Shore A or D, according to ISO 868 (5 seconds measurement) Specific Gravity, according to ASTM D6111-09
Flammability, according to Underwriters Laboratories UL-94 vertical testing method.

The surface roughness of extruded strips was measured by using a model 211 Surftest surface roughness tester with 4 mN (0.4 gf) measuring force with a cut off setting 0.8 mm, manufactured by Mitutoyo Corporation of Japan.

A 19.1 mm (¾") diameter single screw extruder was used to make test strips for measuring the surface roughness. It has a 24:1 L/D ratio general purpose screw having a compression ratio of 3. The strip die dimension is 50.8 mm (2") wide, 0.48 mm (0.019") thick and 10.2 mm (0.4") land length. The extruder temperature profile was set to maintain the melt temperature at 204° C. The screw rpm was 90. A conveying belt was used as take off device for the strips; the take off speed was adjusted to have minimum draw-down of the strips and to keep the strips flat. The strip samples are conditioned for a minimum of 15 minutes in a climate controlled lab prior to the testing at a temperature of 23° C.+/−2° C. and a 50%+/− 5% relative humidity. The strip is placed on a smooth, flat surface, while the probe assembly is placed on the test sample strip. The tester will measure Ra and Ry at the same time. Ra is the average roughness. Ry is the peak to valley roughness. The unit of measurement is micron (µm).

Materials Used Are:

PP1 is polypropylene homopolymer (Lyondell Basell Profax PH835) with Melt Flow Rate of 35. (tested at 230° C. and 2.16 Kg load according to ISO 1133).

PP2 is polypropylene homopolymer (H01 G-00 grade from Ineos) with Melt Flow Rate of 1.2.

Polyolefin copolymer blend is Softell V 021A from LyondellBasell.

SEBS block copolymer is Septon 8006 from Kuraray.

Black color concentrate is 40 wt % carbon black and 60 wt % PP.

ADK stabilizer FP2100J is a flame retardant mixture comprising 55-65% of piperazine pyrophosphate and 35-45% of a phosphoric acid compound; the material is manufactured by Adeka Corporation.

Sarlink M135N is a phenolic cured TPV material based on 30 wt % EPDM, 6.8 wt % polypropylene homopolymer, 54.1 wt % Chevron Paralux 6001 mineral oil, with filler and additives.

Sarlink 4190N is a phenolic cured TPV material based on 23% EPDM rubber, 33% polypropylene and 31.5% of Chevron Paralux 6001 mineral oil, with filler and additives.

Softell V021A is a soft propylene ethylene copolymer material produced by Lyondell Basell. It has a 75 Shore A hardness, 20 MPa flex modules, a melt flow rate (230° C., 2.16 kg) or 12 g/10 min.

Hydrocarbon oil: Chevron Paralux 6001 mineral oil

Exolit AP 760 flame retardant from Clariant Corporation is a blend of ammonium polyphosphate and synergist tris(2-hydroxyethyl) isocyanurate (THEIC).

Exolit OP 1311 flame retardant from Clariant Corporation is a mixture of aluminium phosphinate and melamine polyphosphate.

Magnifin H5MV is a surface coated magnesium hydroxide flame retardant made by Albemarle Corporation.

JJAZZ SP1 flame retardant from is made by JJI Technologies LLC. Its main ingredient is ethylene diamine phosphate.

Table 1A, 1B, 2-4 shows the results and properties of the obtained compositions. Compositions E1 to E8 were obtained according to the present invention, whereas compositions A1, A2, B1, B2, C1 and C2 should be considered as comparative examples.

TABLE 1A

Thermoplastic Elastomer Compositions based on the invention using ADK FP-2100J.

| | COMPOSITION | | | | |
|---|---|---|---|---|---|
| | E1 | E2 | E3 | E4 | E6 |
| TPV - Sarlink M135N* | 41.50% | 48.67% | 44.83% | 53.17% | 48.58% |
| PP1 (high melt flow) | — | — | 6.42% | 8.83% | 13.42% |
| Black color concentrate | 3.00% | 3.00% | 3.00% | 3.00% | 3.00% |
| Polyolefin copolymer blend | 15.50% | 18.33% | 5.75% | — | — |
| Flame retardant -ADK FP-2100J | 40.00% | 30.00% | 40.00% | 35.00% | 35.00% |
| PROPERTIES | | | | | |
| Hardness, Shore A | 68 | 66 | 82 | 83 | 91 |
| Tensile, MPa | 2.05 | 2.19 | 3.06 | 4.03 | 4.45 |
| Elongation, % | 345 | 380 | 488 | 536 | 401 |
| 100% Modulus, MPa | 1.69 | 1.68 | 2.52 | 2.57 | 3.51 |
| Specific Gravity | 1.13 | 1.09 | 1.13 | 1.11 | 1.11 |

TABLE 1A-continued

Thermoplastic Elastomer Compositions based on the invention using ADK FP-2100J.

| | COMPOSITION | | | | |
|---|---|---|---|---|---|
| | E1 | E2 | E3 | E4 | E6 |
| Compression Set (70° C., 22 hrs), % | 59.3 | 56.5 | 60.4 | 51.0 | 59.4 |
| Surface Roughness, Ra (μm) | 1.40 | 1.55 | 1.46 | 1.43 | 1.22 |
| Surface Roughness, Ry (μm) | 8.86 | 9.20 | 10.13 | 8.94 | 7.86 |
| UL-94 flammability Rating @ 3.15 mm | V-0 | V-0 | V-0 | V-0 | V-0 |

TABLE 1B

Thermoplastic Elastomer Compositions based on the invention using ADK FP-2100J.

| | COMPOSITION | |
|---|---|---|
| | E7 | E8 |
| TPV - Sarlink M135N | — | — |
| TPV - Sarlink 4190 | 59.20% | 39.70% |
| PP1 (high melt flow) | — | — |
| Black color concentrate | 2.8% | 2.5% |
| Polyolefin copolymer blend | — | — |
| Flame retardant -ADK FP-2100J | 38.00% | 38.00% |
| Talc | — | — |
| SEBS block copolymer | — | 6.60% |
| PP2 | — | 6.60% |
| Hydrocarbon Oil | — | 6.60% |
| PROPERTIES | | |
| Hardness, Shore A (5 sec.) | 95 | 95 |
| Hardness, Shore D (5 sec.) | 37.6 | 37.5 |
| Tensile, MPa | 9.10 | 9.29 |
| Elongation, % | 551 | 562 |
| 100% Modulus, MPa | 5.12 | 4.90 |
| Specific Gravity | 1.13 | 1.14 |
| Compression Set (70° C., 22 hrs), % | 60.1 | 60.4 |
| Surface Roughness, Ra (μm) | 1.72 | 1.36 |
| Surface Roughness, Ry (μm) | 12.9 | 11.7 |
| UL-94 flammability Rating @ 3.15 mm | V-0 | V-0 |

In Examples E7, the base TPV material is Sarlink 4190N instead of Sarlink M135N. Sarlink 4190N TPV can provide very good tensile strength, which is an important property for some applications. This particular composition with Sarlink 4190N and high loading of flame retardant gives slightly higher surface roughness. This property can be improved by using the combination of Sarlink 4190N TPV and SEBS block copolymer, polypropylene and oil as illustrated by Example E8.

The examples E1-E8 show thermoplastic elastomer compositions according to the invention. They are flame retardant, show low hardness, good elongation, good compression set and surface roughness (Ra and Ry).

TABLE 2

Compositions based on Exolit AP 760.

| | COMPOSITION | |
|---|---|---|
| | A1 | A2 |
| TPV - Sarlink M 135N | 41.50% | 41.50% |
| PP1 | — | 5.58% |
| Black color concentrate | 8.00% | 8.00% |
| Polyolefin copolymer blend | 10.50% | 4.92% |
| Flame retardant - Exolit AP 760 | 40.00% | 40.00% |
| PP2 | — | — |

TABLE 2-continued

Compositions based on Exolit AP 760.

| | COMPOSITION | |
|---|---|---|
| | A1 | A2 |
| PROPERTIES | | |
| Hardness, Shore A | 72 | 83 |
| Tensile, MPa | 2 | 2.4 |
| Elongation, % | 346 | 202 |
| 100% Modulus, MPa | 1.8 | 2.2 |
| Specific Gravity | 1.17 | 1.18 |
| Compression Set (70° C., 22 hrs), % | 71 | 82 |
| Surface Roughness, Ra (μm) | 3.2 | 3.4 |
| Surface Roughness, Ry (μm) | 18.1 | 19.4 |
| UL-94 Flammability @ 3.15 mm | V-0 | V-0 |

The compositions comprising a different flame retardant (Exolit AP 760) make very rough profiles (high surface roughness), a poor compression set and low elongation.

TABLE 3

Compositions based on Exolit OP 1311.

| | COMPOSITION | |
|---|---|---|
| | B1 | B2 |
| TPV - Sarlink M135N | 41.50% | 48.58% |
| PP1 | — | 7.17% |
| Black color concentrate | 3.00% | 3.00% |
| Polyolefin copolymer blend | 15.50% | 6.25% |
| Flame retardant - Exolit OP 1311 | 40.00% | 35.00% |
| PROPERTIES | | |
| Hardness, Shore A | 72 | 83 |
| Tensile, MPa | 1.72 | 2.62 |
| Elongation, % | 222 | 231 |
| 100% Modulus, MPa | 1.62 | 2.48 |
| Specific Gravity | 1.07 | 1.06 |
| Compression Set (70° C., 22 hrs), % | 64.8 | 57.5 |
| Surface Roughness, Ra (μm) | 2.20 | 2.03 |
| Surface Roughness, Ry (μm) | 13.86 | 12.86 |
| UL-94 Flammability Rating @ 3.15 mm | V-0 | V-0 |

Compositions comprising Exolit OP 1311 as flame retardant show a low elongation and tensile strength, and make profiles having poor surface roughness.

TABLE 4

Compositions based on Magnesium Hydroxide.

| | COMPOSITION | |
|---|---|---|
| | C1 | C2 |
| TPV - Sarlink M135N | 57.45% | 32.75% |
| PP1 | 9.55% | 5.42% |
| Black color concentrate | 3.00% | 1.83% |
| Flame retardant - Magnifin H5MV | 30.00% | 60.00% |
| PROPERTIES | | |
| Hardness, Shore A | 75 | 89 |
| Tensile, Mpa | 4.9 | 2.9 |
| Elongation, % | 550 | 305 |
| 100% Modulus, Mpa | 2.2 | 1.8 |
| Specific Gravity | 1.12 | 1.45 |
| UL-94 Flammability Rating @ 3.15 mm | No | V-1 |

Composition comprising magnesium hydroxide can show the desired mechanical properties, but then the compositions are not flame retardant. Even with higher amounts of magnesium hydroxide (C2) only a V-1 rating can be achieved, but then the tensile strength, elongation, and modulus deteriorate. From the above tables it is clear that the compositions comprising a thermoplastic elastomer and a flame retardant according to the present invention show improved elongation, compression set and/or surface roughness values at comparable Shore A hardness when compared to the comparative compositions A1, A2, B1, B2, C1 and C2.

TABLE 5

Compositions based on ethylene diamine phosphate.

| | COMPOSITION | |
|---|---|---|
| | E4 | D1 |
| TPV - Sarlink M135N | 53.17% | 53.17% |
| PP1 (high melt flow) | 8.83% | 8.83% |
| Black color concentrate | 3.00% | 3.00% |
| Polyolefin copolymer blend | — | — |
| Flame retardant -ADK FP-2100J | 35.00% | — |
| Flame retardant -JJI JJAZZ SP1 | — | 35.00% |
| PROPERTIES | | |
| Hardness, Shore A (5 sec.) | 83 | 84 |
| Tensile, MPa | 4.03 | 4.28 |
| Elongation, % | 536 | 540 |
| 100% Modulus, MPa | 2.57 | 2.58 |
| Specific Gravity | 1.11 | 1.07 |
| Compression Set (70° C., 22 hrs), % | 51 | 52 |
| Surface Roughness, Ra | 1.43 | 1.80 |
| Surface Roughness, Ry | 8.94 | 11.40 |
| UL-94 flammability Rating @ 3.15 mm | V-0 | V-0 |

Comparative example D1 is prepared with a flame retardant (JJI JJAZZ SP1, ethylene diamine phosphate). The composition shows good flame retardant properties. However, its surface roughness is worse than that of the invention example E4 material having the same base materials and flame retardant loading. This is another example which indicates the invention material has advantage of better extrusion quality. The invention example E4 has a better extrusion quality.

The operating window of the composition D1 is also very narrow: at 215° C. the D1 composition degraded during the extrusion process or when injection molded. This is caused by a degradation of the flame retardant, which starts to decompose at this temperature. Therefore the flame retardant of comparative example D1 cannot be used in a TPV, or a TPV application wherein often the TPV is extruded at temperatures between 220 and 250° C.

The invention claimed is:

1. A dynamically vulcanized thermoplastic elastomer composition, comprising: a thermoplastic elastomer and a flame retardant, wherein the flame retardant comprises at least a) a compound selected from the group consisting of a piperazine phosphate, piperazine pyrophosphate and piperazine polyphosphate, and b) a phosphoric acid compound, wherein the thermoplastic elastomer is an olefin-based dynamically vulcanized thermoplastic elastomer comprising polypropylene and EPDM rubber, and wherein the composition further comprises an oil selected from the group consisting essentially of a paraffinic oil, naphthenic oil, and aromatic oil.

2. The dynamically vulcanized thermoplastic elastomer composition according to claim 1, wherein the thermoplastic elastomer has a hardness of less than 95 Shore A, (ISO 686; 5 seconds).

3. The dynamically vulcanized thermoplastic elastomer composition according to claim 1, wherein the composition has:
   i. an elongation between 300 and 1 000% (ISO 37:2005)
   ii. a hardness between 25 and 94 Shore A (ISO 868; 5 seconds)
   iii. a compression set (70° C., 22 hrs) between 10 and 70% (ISO 815)
   iv. an average surface roughness (Ra) between 0.1 µm-2 µm
   v. a peak to valley roughness (Ry) between 1 µm and 11 µm and
   vi. a UL 94 flammability rating @3.15 mm of at least V-O.

4. The dynamically vulcanized thermoplastic elastomer composition according to claim 1, wherein the composition has:
   i. an elongation between 350 and 900% (ISO 37:2005)
   ii. a hardness between 50 and 94 Shore A (ISO 868; 5 seconds)
   iii. a compression set (70° C., 22 hrs) between 20 and 61% (ISO 815)
   iv. an average surface roughness (Ra) between 0.2 µm-1.6 µm
   v. a peak to valley roughness (Ry) between 2 µm and 10 µm and
   vi. a UL 94 flammability rating @3.15 mm of at least V-O.

5. The dynamically vulcanized thermoplastic elastomer composition according to claim 1, wherein the thermoplastic elastomer comprises between 3 and 45 wt % polypropylene, relative to the total amount of the thermoplastic elastomer.

6. The dynamically vulcanized thermoplastic elastomer composition according to claim 1, wherein the flame retardant is between 7 and 70 wt %, relative to the total amount of the composition.

7. The dynamically vulcanized thermoplastic elastomer composition according to claim 1, wherein the flame retardant comprises between 20 and 90 wt % of the a) compound selected from the group consisting of piperazine phosphate, piperazine pyrophosphate and piperazine polyphosphate, relative to the total amount of the flame retardant.

8. The dynamically vulcanized thermoplastic elastomer composition according to claim 1, wherein the flame retardant contains piperazine pyrophosphate.

9. The dynamically vulcanized thermoplastic elastomer composition according to claim 1, wherein the b) phosphoric acid compound comprises a salt of melamine and an inorganic phosphorus compound.

10. An article comprising the composition according to claim 1, wherein the article has an average roughness (Ra) less than 2µ.

11. A dynamically vulcanized thermoplastic elastomer composition, comprising: a thermoplastic elastomer and a flame retardant, wherein the flame retardant comprises at least a) one or more of piperazine phosphate, piperazine pyrophosphate and piperazine polyphosphate, and b) a phosphoric acid compound, wherein the phosphoric acid compound comprises a salt of melamine and an inorganic phosphorus compound, and wherein the thermoplastic elastomer comprises a thermoplastic polyolefin, a dynamically vulcanized elastomer comprising monomer units or ethylene, an α-olefin and one or more non-conjugated polyenes and oil.

12. The dynamically vulcanized thermoplastic elastomer composition according to claim 11, wherein the thermoplastic elastomer has a hardness of less than 95 Shore A, (ISO 686; 5 seconds) and wherein the olefin-based dynamically vulcanized thermoplastic elastomer comprises polypropylene, EPDM rubber, and the oil that is selected from a paraffinic oil, naphthenic oil, and an aromatic oil.

13. The dynamically vulcanized thermostatic elastomer composition according to claim 12, wherein the composition has:

i. an elongation between 300 and 1000% (ISO 37:2005)
  ii. a hardness between 25 and 94 Shore A (ISO 868; 5 seconds)
  iii. a compression set (70° C., 22 hrs) between 10 and 70% (ISO 815)
  iv. an average surface roughness (Ra) between 0.1 μm-2 μm
  v. a peak to valley roughness (Ry) between 1 μm and 11 μm and
  vi. a UL 94 flammability rating @3.15 mm or at least V-O.

14. The dynamically vulcanized thermoplastic elastomer composition according to claim 12, wherein the composition has:
  i. an elongation between 350 and 900% (ISO 37:2005)
  ii. a hardness between 50 and 94 Shore A (ISO 868; 5 seconds)
  iii. a compression set (700 C, 22 hrs) between 20 and 61% (ISO 815)
  iv. an average surface roughness (Ra) between 0.2 μm-1.6 μm
  v. a peak to valley roughness (Ry) between 2 μm and 10 μm and
  vi. a UL 94 flammability rating @3.15 mm of at least V-O.

15. The dynamically vulcanized thermoplastic elastomer composition according to claim 12, wherein the thermoplastic elastomer comprises between 3 and 45 wt % polypropylene, relative to the total amount of the thermoplastic elastomer and the flame retardant is between 7 and 70 wt %, relative to the total amount of the composition.

16. The dynamically vulcanized thermoplastic elastomer composition according to claim 12, wherein the flame retardant comprises between 20 and 90 wt % of the a) one or more of piperazine phosphate, piperazine pyrophosphate and piperazine polyphosphate, relative to the total amount of the flame retardant.

17. A dynamically vulcanized thermoplastic elastomer composition, comprising: a thermoplastic elastomer and a flame retardant, wherein the flame retardant comprises at least a) one or more of piperazine phosphate, piperazine pyrophosphate and piperazine polyphosphate, and b) a phosphoric acid compound, wherein the thermoplastic elastomer comprises a thermoplastic polyolefin, a dynamically vulcanized elastomer comprising monomer units of ethylene, an α-olefin and one or more non-conjugated polyenes and oil, and wherein the thermoplastic elastomer comprises between 3 and 45 wt % polypropylene, relative to the total amount of the thermoplastic elastomer.

18. The dynamically vulcanized thermoplastic elastomer composition according to claim 17, wherein the composition has:
  i. an elongation between 300 and 1000% (ISO 37:2005)
  ii. a hardness between 25 and 94 Shore A (ISO 868; 5 seconds)
  iii. a compression set (700 C, 22 hrs) between 10 and 70% (ISO 815)
  iv. an average surface roughness (Ra) between 0.1 μm-2 μm
  v. a peak to valley roughness (Ry) between 1 μm and 11 μm and
  vi. a UL 94 flammability rating @3.15 mm of at least V-O;
  wherein the b) phosphoric acid compound comprises a salt of melamine and an inorganic phosphorus compound, and wherein the dynamically vulcanized elastomer comprises EPDM.

19. The dynamically vulcanized thermoplastic elastomer composition according to claim 17, wherein the composition has:
  i. an elongation between 350 and 900% (ISO 37:2005)
  ii. a hardness between 50 and 94 Shore A (ISO 868: 5 seconds)
  iii. a compression set (700 C, 22 hrs) between 20 and 61% (ISO 815)
  iv. an average surface roughness (Ra) between 0.2 μm-1.6 μm
  v. a peak to valley roughness (Ry) between 2 μm and 10 μm and
  vi. a UL, 94 flammability rating @3.15 mm of at least V-O;
  wherein the b) phosphoric acid compound comprises a salt of melamine and an inorganic phosphorus compound, and wherein the dynamically vulcanized elastomer comprises EPDM.

\* \* \* \* \*

UNITED STATES PATENT AND TRADEMARK OFFICE
CERTIFICATE OF CORRECTION

Page 1 of 1

PATENT NO. : 8,710,124 B2
APPLICATION NO. : 13/132663
DATED : April 29, 2014
INVENTOR(S) : Lawrence Lo et al.

It is certified that error appears in the above-identified patent and that said Letters Patent is hereby corrected as shown below:

In the Claims

Column 10, claim 11, line 56, "or" should be replaced with --of--

Column 11, claim 13, line 9, "or" should be replaced with --of--

Column 11, claim 14, line 16, "700" should be replaced with --70°--

Column 12, claim 18, line 13, "700" should be replaced with --70°--

Column 12, claim 19, line 29, "700" should be replaced with --70°--

Column 12, claim 19, line 35, the "," between UL and 94 should be removed

Signed and Sealed this
Fifth Day of August, 2014

Michelle K. Lee
*Deputy Director of the United States Patent and Trademark Office*